(12) United States Patent
Clary

(10) Patent No.: US 8,416,089 B1
(45) Date of Patent: Apr. 9, 2013

(54) LEAK DETECTING TRAY DEVICE

(76) Inventor: James E. Clary, Chandler, AZ (US)

(*) Notice: Subject to any disclaimer, the term of this patent is extended or adjusted under 35 U.S.C. 154(b) by 261 days.

(21) Appl. No.: 12/778,981

(22) Filed: May 12, 2010

(51) Int. Cl.
*G08B 21/00* (2006.01)

(52) U.S. Cl.
USPC ........... 340/602; 340/603; 340/604; 340/605; 340/618; 73/592; 73/40; 702/51

(58) Field of Classification Search .................... None
See application file for complete search history.

(56) References Cited

U.S. PATENT DOCUMENTS

| | | | |
|---|---|---|---|
| 1,528,737 A | 3/1925 | Mailman | |
| 3,353,615 A | 11/1967 | Nekimken | |
| D213,101 S | 1/1969 | Delk | |
| 4,037,427 A | 7/1977 | Kramer | |
| 4,814,752 A | 3/1989 | Lehman | |
| 4,903,723 A | 2/1990 | Sublett | |
| 5,339,676 A * | 8/1994 | Johnson | 73/40 |
| 5,655,561 A * | 8/1997 | Wendel et al. | 137/79 |
| 5,729,990 A | 3/1998 | Basse et al. | |
| 5,899,026 A * | 5/1999 | Williams et al. | 52/58 |
| D418,377 S | 1/2000 | Ferguson | |
| 6,135,133 A | 10/2000 | Ridgeway, Jr. | |
| 6,414,598 B2 | 7/2002 | Freill et al. | |
| 7,134,579 B2 * | 11/2006 | Scheindel | 222/402.1 |
| 7,492,272 B1 * | 2/2009 | MacDonald | 340/618 |
| 2004/0050420 A1 * | 3/2004 | Huang et al. | 137/312 |
| 2008/0055112 A1 * | 3/2008 | McGinty et al. | 340/870.16 |
| 2008/0252447 A1 * | 10/2008 | Atherton et al. | 340/540 |
| 2011/0187540 A1 * | 8/2011 | Schwab | 340/605 |

* cited by examiner

*Primary Examiner* — Benjamin C Lee
*Assistant Examiner* — Rajsheed Black-Childress

(57) ABSTRACT

A leak detecting tray device featuring a base tray having a bottom surface and sides, wherein the sides and bottom surface together form an enclosure for collecting liquid, wherein the base tray is constructed from a material comprising silicone; a moisture sensor disposed in the base tray, the moisture sensor is configured to detect moisture; an alarm system with speaker; and a microprocessor operatively connected to the moisture sensor and the alarm system with speaker, wherein the microprocessor is configured to receive a first sensor input signal from the moisture sensor when the moisture sensor detects moisture whereupon the microprocessor sends a first alarm output command to the alarm system to activate the alarm system.

7 Claims, 4 Drawing Sheets

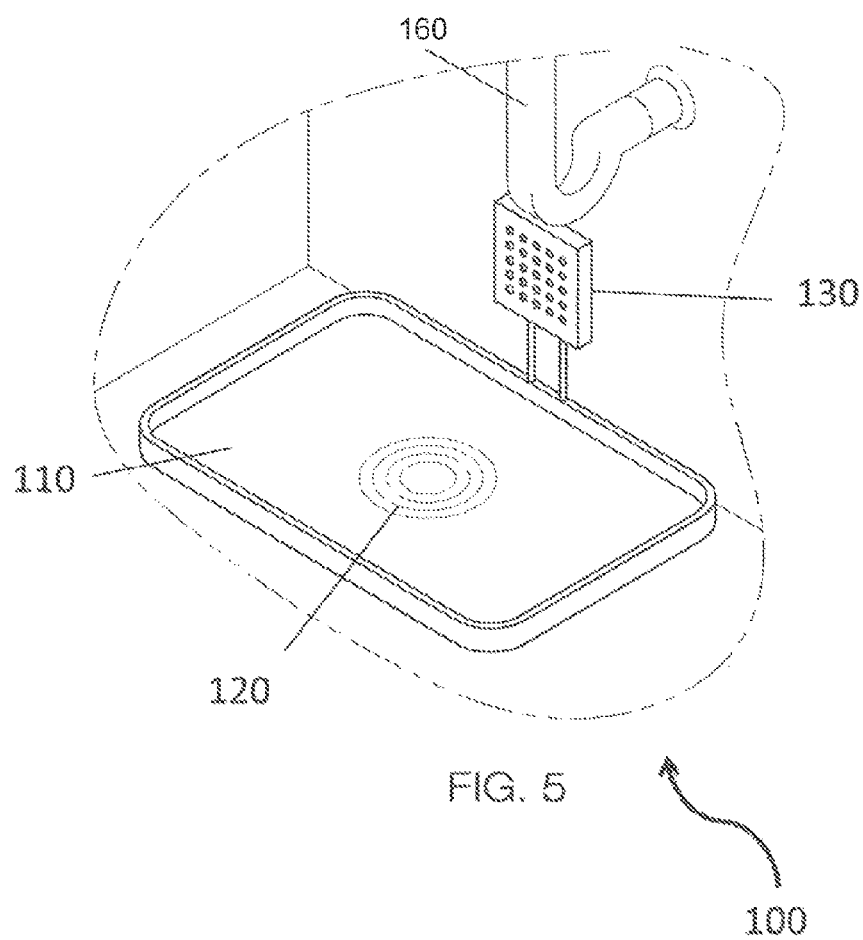

LEAK DETECTING TRAY DEVICE

FIELD OF THE INVENTION

The present invention is directed to a tray for collecting leaking liquid such as water, more particularly to a collection tray comprising an alarm for indicating the presence of a leak.

BACKGROUND OF THE INVENTION

Water leaks, for example leaks under sink cabinets, are a common problem. Unfortunately, such leaks may go undetected, leading to water damage in the home or building. The present invention features a leak detecting tray device for sequestering and collecting liquid (e.g., water) when a leak occurs. The leak detecting tray device comprises an alarm system for alerting a user (e.g., a property owner) that a leak is present. This provides the user an opportunity to stop and fix the leak before costly damage occurs to the cabinets, floors, etc. The device of the present invention is durable and easy to install and clean. The device can be constructed in a variety of styles, colors, and designs. The device is not limited to collecting water from water leaks, for example the device can be used to hold household cleaning products and detect the presence of leaks in the cleaning products.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a leak detecting tray device. In some embodiments, the device comprises a base tray having a bottom surface and a first side, a second side, a third side, and a fourth side, wherein the sides and bottom surface together form an enclosure for collecting liquid, wherein the base tray is constructed from a material comprising silicone; a moisture sensor disposed in the base tray, the moisture sensor is configured to detect moisture; an alarm system with speaker; a microprocessor operatively connected to the moisture sensor and the alarm system with speaker, wherein the microprocessor is configured to receive a first sensor input signal from the moisture sensor when the moisture sensor detects moisture whereupon the microprocessor sends a first alarm output command to the alarm system to activate the alarm system; and a power switch for turning on and off the device.

In some embodiments, the device comprises a base tray having a bottom surface and a first side, a second side, a third side, and a fourth side, wherein the sides and bottom surface together form an enclosure for collecting liquid, wherein the base tray is constructed from a material comprising silicone; a moisture sensor disposed in the base tray, the moisture sensor is configured to detect moisture; a first microprocessor operatively connected to the moisture sensor; a transmitter operatively connected to the first microprocessor; and a remote comprising a receiver, a second microprocessor, and an alarm system with speaker, the second microprocessor is operatively connected to the receiver and to the alarm system with speaker; wherein the first microprocessor is configured to receive a first sensor input signal from the moisture sensor when the moisture sensor detects moisture whereupon the first microprocessor generates a first transmitter output command to the transmitter to cause the transmitter to send a first alarm signal, wherein the second microprocessor is configured to receive a first receiver input signal from the receiver when the receiver receives the first alarm signal whereupon the second microprocessor generates a first alarm output command to the alarm system to activate the alarm system.

In some embodiments, the base tray is between about 0.5 to 1.5 inches in height as measured from the bottom surface to top edges of the sides. In some embodiments, the device further comprises a power source (e.g., battery) housed in a battery compartment disposed on the base tray. In some embodiments, the alarm system is housed in a housing disposed on the base tray.

BRIEF DESCRIPTION OF THE DRAWINGS

FIG. 5 is an in-use view of the device of FIG. 1.

DESCRIPTION OF PREFERRED EMBODIMENTS

Referring now to FIGS. 1-5, the present invention features a leak detecting tray device 100 for collecting liquid (e.g., water) when a leak occurs, for example a leak under a sink in a kitchen or bathroom. FIG. 5 shows the device 100 placed under a sink. The leak detecting tray device 100 is not limited to collecting water from water leaks, for example the device 100 can be used to hold household cleaning products and detect the presence of leaks in the cleaning products.

Figure 1:
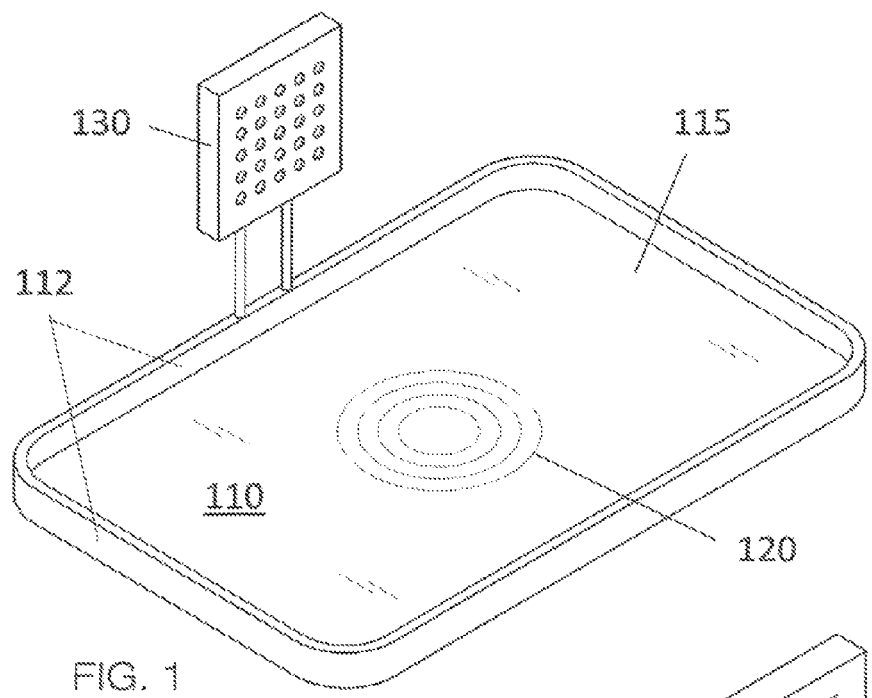
FIG. 1 is a front perspective view of the leak detecting tray device of the present invention.
Figure 3:
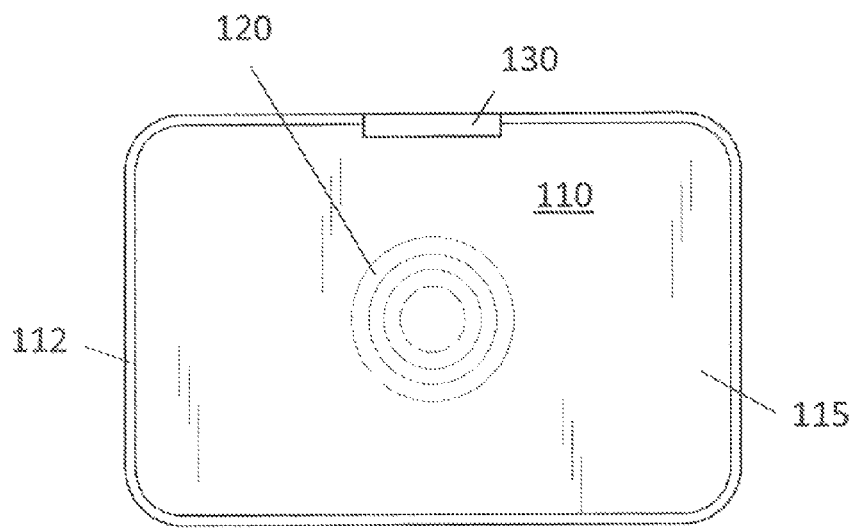
FIG. 3 is a top view of the device of FIG. 1.

Referring now to FIG. 1 and FIG. 3, the leak detecting tray device 100 of the present invention comprises a base tray 110 having a bottom surface 115 and sides 112, for example a first side, a second side, a third side, and a fourth side. The sides 112 and bottom surface 115 together form an enclosure for collecting liquid (e.g., water). The base tray 110 may be constructed from a variety of materials and in a variety of sizes. For example, in some embodiments, the base tray 110 is constructed from a material comprising a silicone, a plastic, a metal, the like, or a combination thereof. The base tray 110 of the present invention is not limited to the aforementioned materials.

In some embodiments, the base tray 110 is between about 0.5 to 1.0 inches in height as measured from the bottom surface 115 to the top edges of the sides 112. In some embodiments, the base tray 110 is between about 1 to 1.5 inches in height as measured from the bottom surface 115 to the top edges of the sides 112. In some embodiments, the base tray 110 is more than about 1.5 inches in height. The base tray 100 is not limited to the aforementioned sizes.

Disposed in the center of the base tray 110 is a moisture sensor 120. Moisture sensors 120 are well known to one of ordinary skill in the art. The moisture sensor 120 is operatively connected to an alarm system 130 (e.g., with a speaker) via a microprocessor. When the moisture sensor 120 detects the presence of moisture (e.g., when a leak occurs), the moisture sensor 120 sends an input signal to the microprocessor, which sends an output command to the alarm system 130 to activate the alarm system. In some embodiments, the alarm system 130 is disposed in a housing on the base tray 110. The alarm system 130 is not limited to this location and configuration.

Figure 2:
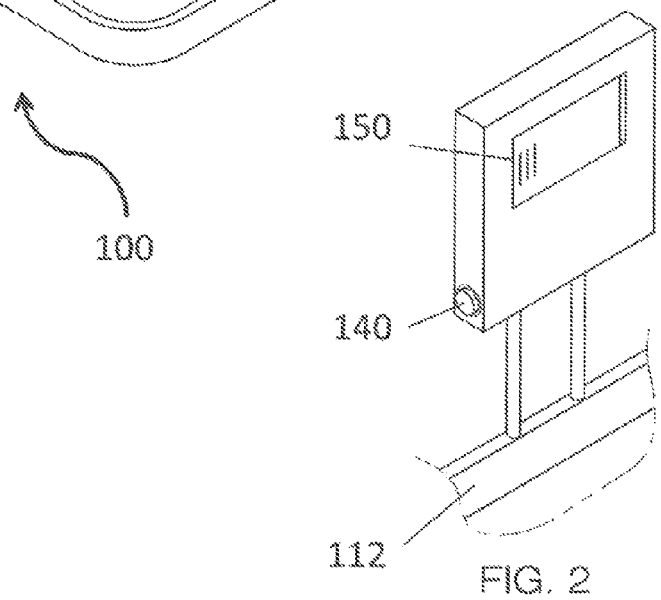
FIG. 2 is a back perspective view of the device of FIG. 1.

Referring now to FIG. 2, the device 100 comprises a power switch 140 for turning on and off the device 100. Power switches are well known to one of ordinary skill in the art. In some embodiments, the power switch 140 is operatively connected to the moisture sensor 120 and/or the alarm system 130 and/or the microprocessor. Referring now to FIG. 5, the system 100 comprises a waste line p-trap 160 of a sink.

The device 100 of the present invention comprises a power source, for example a battery. The power source (e.g., battery) may be housed in a battery compartment 150. As shown in FIG. 2, the battery compartment 150 is disposed in the housing disposed on the base tray 110. The battery compartment 150 is not limited to this location. The moisture sensor 120 and/or the alarm system 130 and/or the microprocessor are operatively connected to the power source.

Figure 4:
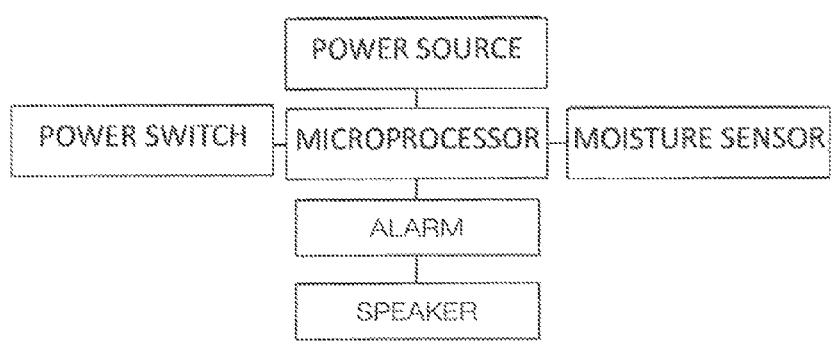
FIG. 4 is a schematic representation of the electrical components of the device of the present invention.
Figure 4A:
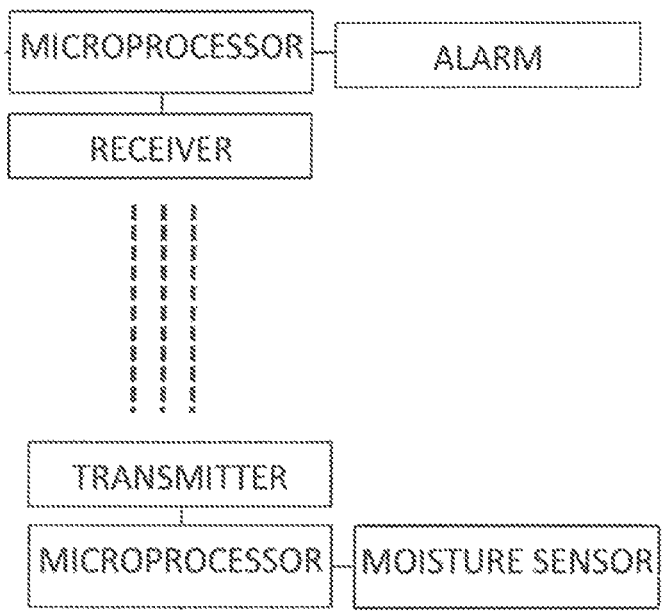
FIG. 4A is a schematic representation of the electrical components of the device of the present invention including a transmitter and receiver.

In some embodiments, the microprocessor is operatively connected to the alarm system via a transmitter-receiver system (see FIG. 4A). For example, the microprocessor may be operatively connected to a transmitter, which is configured to send signals to a receiver in a remote. The receiver is operatively connected to the alarm system. The remote may be placed in a location of the user's choice. In some embodiments, when the microprocessor receives the input signal from the moisture sensor 120, the microprocessor sends an output command to the transmitter to cause the transmitter to send an alert signal the receiver. When the receiver receives the signal from the transmitter, the receiver can activate the alarm system. In some embodiments, the receiver activates the alarm system via a remote microprocessor.

Without wishing to limit the present invention to any theory or mechanism, it is believed that the device 100 of the present invention is advantageous because the base tray comprises 100% silicone, which is easy to install and clean; the device is versatile and can be used for many different purposes, for example under sinks, or for holding household cleaners; and the device can easily by used by a homeowner or renter.

As used herein, the term "about" refers to plus or minus 10% of the referenced number. For example, an embodiment wherein the base tray 110 is about 1.0 inch in height includes a base tray 110 between 0.9 and 11 inches in height.

The following the disclosures of the following U.S. patents are incorporated in their entirety by reference herein: U.S. Pat. No. 6,414,598; U.S. Pat. No. 4,903,723; U.S. Pat. No. 5,729,990; U.S. Pat. No. 1,528,737; U.S. Pat. No. 6,135,133; U.S. Pat. No. 4,037,427; U.S. Pat. No. 3,353,615; U.S. Pat. No. 4,814,752.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A leak detecting tray system consisting of:
   (a) a base tray having a flat, non-sloping bottom surface and a first side, a second side, a third side, and a fourth side, wherein the base tray comprises an open top area bordered by a top rim of the first side, the second side, the third side, and the fourth side, wherein the open top area is equal to the area of the flat, non-sloping bottom surface, wherein the sides and bottom surface together form an enclosure for collecting liquid, wherein the base tray is constructed from a material comprising silicone rubber;
   (b) a moisture sensor disposed in or on the base tray at a center of the tray on the flat, non-sloping bottom surface, the moisture sensor is configured to detect moisture;
   (c) an alarm system with speaker, disposed on and above the first side;
   (d) a microprocessor operatively connected to the moisture sensor and the alarm system with speaker, wherein the microprocessor is configured to receive a first sensor input signal from the moisture sensor when the moisture sensor detects moisture whereupon the microprocessor sends a first alarm output command to the alarm system to activate the alarm system;
   (e) a power switch for turning on and off the system; and
   (f) a waste line p-trap of a sink disposed above the base tray.

2. The system of claim 1, wherein the base tray is between about 0.5 to 1.0 inches in height as measured from the bottom surface to top edges of the sides.

3. The system of claim 1, wherein the base tray is between about 1 to 1.5 inches in height as measured from the bottom surface to top edges of the sides.

4. The system of claim 1, wherein the alarm system is housed in a housing disposed on the base tray.

5. A leak detecting tray system consisting of:
   (a) a base tray having a flat, non-sloping bottom surface and a first side, a second side, a third side, and a fourth side, wherein the base tray comprises an open top area bordered by a top rim of the first side, the second side, the third side, and the fourth side, wherein the open top area is equal to the area of the flat, non-sloping bottom surface, wherein the sides and bottom surface together form an enclosure for collecting liquid, wherein the base tray is constructed from a material comprising silicone rubber;
   (b) a moisture sensor disposed in the base tray at a center of the tray, the moisture sensor is configured to detect moisture;
   (c) a first microprocessor operatively connected to the moisture sensor;
   (d) a transmitter operatively connected to the first microprocessor;
   (e) a remote comprising a receiver, a second microprocessor, and an alarm system with speaker disposed on and above the first side, the second microprocessor is operatively connected to the receiver and to the alarm system with speaker; and
   (f) a waste line p-trap of a sink disposed above the base tray;
wherein the first microprocessor is configured to receive a first sensor input signal from the moisture sensor when the moisture sensor detects moisture whereupon the first microprocessor generates a first transmitter output command to the transmitter to cause the transmitter to send a first alarm signal, wherein the second microprocessor is configured to receive a first receiver input signal from the receiver when the receiver receives the first alarm signal whereupon the second microprocessor generates a first alarm output command to the alarm system to activate the alarm system.

6. The system of claim 5, wherein the base tray is between about 0.5 to 1.0 inches in height as measured from the bottom surface to top edges of the sides.

7. The system of claim 5, wherein the base tray is between about 1 to 1.5 inches in height as measured from the bottom surface to top edges of the sides.

* * * * *